C. H. Robertson,
Cheese Press.
No. 18,862. Patented Dec. 15, 1857.
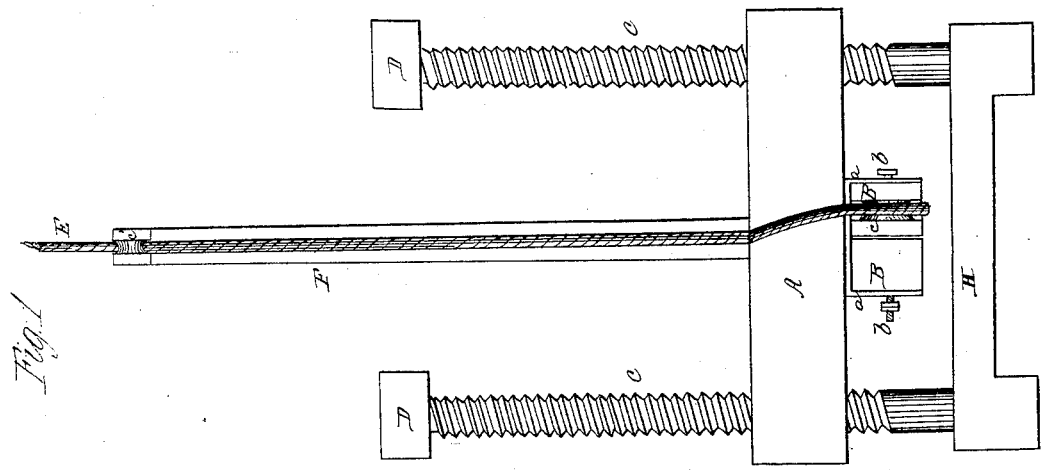
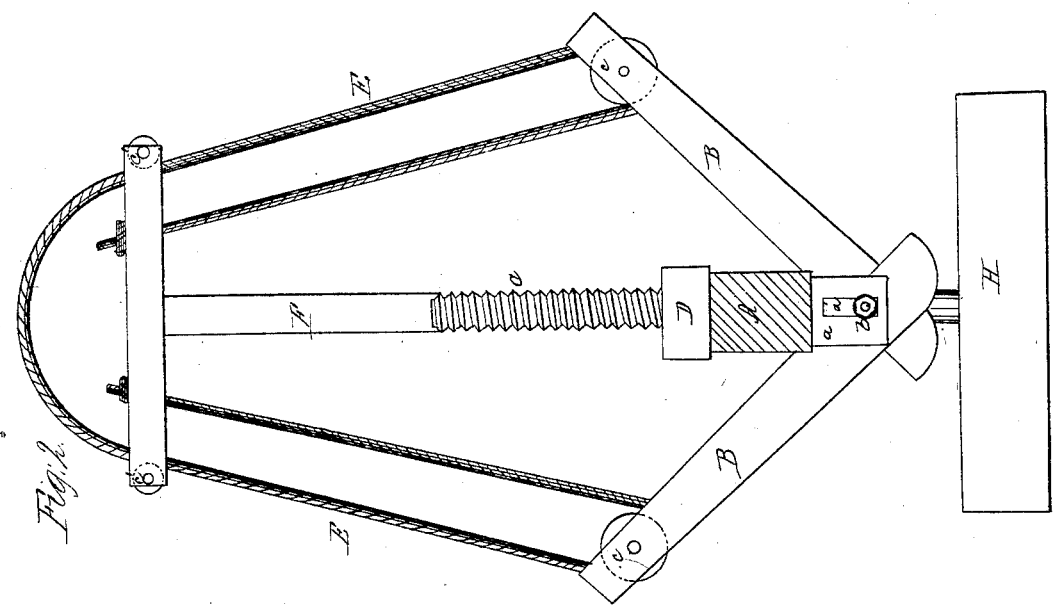

UNITED STATES PATENT OFFICE.

C. H. ROBERTSON, OF MIDDLEPORT, NEW YORK.

CHEESE-PRESS.

Specification of Letters Patent No. 18,862, dated December 15, 1857.

*To all whom it may concern:*

Be it known that I, C. H. ROBERTSON, of Middleport, in the county of Niagara and State of New York, have invented certain new and useful Improvements in Cheese-Presses; and I do hereby declare that the following is a full, clear, and exact description of the same, reference being had to the accompanying drawings and to the letters of reference marked thereon.

The nature of my invention consists in the arrangement of the devices hereinafter mentioned for the purpose of making a cheese press with movable fulcrums to its levers as will be described.

In order that those skilled in the arts may use and manufacture my invention I will proceed to describe its construction and operation.

In the accompanying drawings which make a part of this specification Figure 1 is a side elevation. Fig. 2 is an end elevation.

In Fig. 1, H is the bottom of the machine. C, are screws attached to the bottom H, and perpendicular to it, made of any convenient length, according to the bulk of the cheese intended to be pressed. A, is a cross piece, passing over the screws C, and capable of being moved up and down on said screws and being stationed at any desired point by means of nuts D. (D) are nuts to screws C, and serve to station cross piece A at any desired point. F, is a standard attached to cross piece A with a cross on its upper extremity. $c'$ is a pulley in one extremity of the cross on the top of standard F. ($a$) is a slotted box attached to the bottom of cross piece A. $b$, is a pin passing through said box ($a$) and through the levers B. (B) are levers secured in box ($a$) by means of the pin $b$, and are allowed to change their position by means of the pin $b$, sliding up or down in the slot in box ($a$). ($c$) is a pulley in the end of lever B, and E, is a cord attached at both ends to cross on standard F, and pass over said pulley ($c$).

In Fig. 2, H is the bottom of the machine. B, are levers crossing under cross piece A, and secured together by means of pin $b$. ($a$) is a slotted box attached to the bottom of cross piece A, ($a'$) being the slot in said box. $b$, is a pin sliding up and down in said slot ($a'$) and attaching the levers together. A is a cross piece slipping over, and sliding up and down upon the screws C. ($c$) are pulleys in the outer extremities of the levers B, and around which the cord E passes. F, is a standard with a cross as seen in this figure on its upper extremity. E, is a cord having each end attached to the cross on the standard, passing around pulleys ($c$) in the levers and through the cross again, operating in the cross against the pulleys ($c'$).

In the operation of this machine the cross piece A is elevated to any desired distance to suit the bulk of the cheese. The cheese is then placed under piece A and on the bottom H. When the cheese is placed in, the levers B occupy the position seen in Fig. 1, being parallel with the bottom H. The cross piece A is then lowered to the top of the cheese, and the nuts D screwed down, pressing piece A as tightly upon the cheese as possible. The cord E is then attached to a pin or hook at a sufficient distance from the ground that it will not touch as the levers are elevated and the cheese depressed. Thus the cheese is pressed by its own weight. It will be seen that as the ends of the levers B, are elevated by means of the cord E, being secured together to and under the cross piece A by the pin ($b$) and slotted box ($a$) the bottom of the cross piece A, will act as a fulcrum for said levers B.

When the levers stand in the position seen in Fig. 1 the pin $b$ securing the levers will stand at the top of the slot, but when the levers change to the position seen in Fig. 2, the pin ($b$) will be at the bottom of the slot as seen in this figure—the fulcrum of the levers changing as the levers are elevated, thus throwing the levers on end downward the entire length of the slot ($a'$). I may find it convenient to use a friction roller between the lever and the piece A. The advantage of this arrangement is that I obtain more pressing space with the same power than could be done otherwise. This is very important as it saves the trouble and expense of altering the nuts D, just one half—for the levers sliding down in the slot ($a'$) move just double the distance in this arrangement that they would do if their leverage was fixed.

I do not claim the general features of this machine, the levers, screws, nuts, cross piece A, or cord, as these have before been used; but What I do claim as new and desire to secure by Letters Patent is—

1. I claim the employment of the slotted box ($a$) attached to the crosspiece A, for the purpose of confining the levers B, and allowing them to slip on end by means of the slots in said box, thus changing position and gaining the length of the slot in downward motion in addition to the fixed distance of the levers, before a change of the nuts D on the screws C is necessary.

2. I claim the combination of the cord E, pulleys (c), levers B, and slotted box a, when arranged with the cross piece A and screws C and nuts D, for the purpose of making a cheese press such as herein described and fully set forth.

C. H. ROBERTSON.

Witnesses:
A. T. SWAIN,
F. CRAIG.